(12) United States Patent
Green et al.

(10) Patent No.: US 6,422,874 B1
(45) Date of Patent: Jul. 23, 2002

(54) VERTEBRAL MODEL

(76) Inventors: Ronald Green, Box 3622, Collingwood, Ont. (CA), L9Y 3Z2; Len Green, 53 Tyrrel Ave., Toronto, Ont. (CA), M6G 2G3

( * ) Notice: Subject to any disclaimer, the term of this patent is extended or adjusted under 35 U.S.C. 154(b) by 0 days.

(21) Appl. No.: 09/686,775

(22) Filed: Oct. 12, 2000

(51) Int. Cl.⁷ ................................................ G09B 23/32
(52) U.S. Cl. .................... 434/274; 434/274; 434/267; 434/256
(58) Field of Search ................... 434/267, 274, 434/257, 256, 428, 265, 275

(56) References Cited

U.S. PATENT DOCUMENTS

| | | | | |
|---|---|---|---|---|
| 1,581,736 A | * | 4/1926 | Hassler | |
| 2,197,975 A | * | 4/1940 | Fleet | 35/17 |
| 4,624,642 A | * | 11/1986 | Ferrara | 434/274 |
| 4,872,841 A | * | 10/1989 | Hamilton | 434/274 |
| 5,672,059 A | * | 9/1997 | Browne-Wilkinson | 434/274 |

* cited by examiner

Primary Examiner—Jacob K. Ackun, Jr.
Assistant Examiner—George Hufnagel
(74) Attorney, Agent, or Firm—Elias Borges

(57) ABSTRACT

A vertebral model for illustrating the alignment and misalignment of the spine is disclosed. The model consists of first and second members movably mounted to each other, the first and second members each having a longitudinal axis. The model also has a third member interposed between the first and second members. The first and second members are movable relative to each other between a first position, wherein the first and second members are coaxially aligned, and a second position wherein the first and second members are not coaxially aligned. The model also has a locking mechanism for releasably locking the first and second members in their second position. The first and second members are configured to resemble two adjoining vertebrae, and the third member is configured to resemble an inter-vertebral disc between two adjoining vertebrae. The invention permits the model to illustrate how the vertebra can be placed into and out of alignment.

15 Claims, 6 Drawing Sheets

VERTEBRAL MODEL

FIELD OF THE INVENTION

The invention relates generally to vertebral models.

BACKGROUND OF THE INVENTION

Many people suffer from back ailments of many types. Oftentimes, these ailments are the result of misaligned spinal vertebrae. Under ideal conditions, spinal vertebrae are aligned in substantially coaxial alignment such that the main body of each vertebrae is substantially vertically disposed when the patient stands upright. However, as a result of injury or as a result of muscular spasms involving the inter-transverse muscles of the spine, two or more vertebrae may be misaligned such that one vertebra is at an angle from the other. As a result of the misalignment, a spinal nerve canal may be constricted causing a pinching of a spinal nerve. Also, a misalignment of vertebrae may result in compression of the inter-vertebral discs, which may result in pain. A misalignment of the vertebrae may result in disc wedging or compression, joint imbrication, changes in muscle length, and decreased size of the intervertebral foramen resulting in nerve impingement.

Over the years, numerous treatments have been brought to bear to assist patients suffering from vertebral misalignment. One of the most effective treatments is to physically re-align the vertebrae by pressing on the transverse spinous process of the misaligned vertebrae with sufficient force to place the vertebrae back into alignment. Oftentimes, the very act of placing the vertebrae back into alignment may result in a gentle "popping" sound as the misaligned vertebrae are repositioned. In order to alleviate anxiety and better prepare patients for this form of treatment, many doctors try to explain the procedure of spinal misalignment and spinal re-alignment. To help illustrate this procedure to patients, health practitioners have used charts and models to illustrate how spinal re-alignment can alleviate problems such as back pain. Some previously existing models do accurately display the various parts of the vertebral column, but fail to illustrate how the misalignment can lead to medical problems. Other models and charts do illustrate the problem, however, they usually lack the flexibility to illustrate the re-alignment process in convincing terms. There remains a need for an accurate three dimensional model which is useful in illustrating the misalignment and re-alignment of the vertebrae.

SUMMARY OF THE INVENTION

The present invention overcomes the limitations of the prior art by providing a vertebral model which is movable between a first position, wherein the model illustrates a properly aligned vertebral column, and a second position wherein the model illustrates a misaligned vertebral column. The vertebral model consists of first and second members movably mounted to each other, the first and second members each having a longitudinal axis. The model also has a third member interposed between the first and second members. The first and second members are movable relative to each other between a first position, wherein the first and second members are coaxially aligned, and a second position wherein the first and second members are not coaxially aligned. The model also has a locking mechanism for releasably locking the first and second members in their second position. The first and second members are configured to resemble two adjoining vertebrae, and the third member is configured to resemble an inter-vertebral disc between two adjoining vertebrae. The invention easily permits the model to illustrate how the vertebra can be placed into and out of alignment.

Other advantages of the present invention will be evident from the following detailed description when read in conjunction with the accompanying drawings which illustrate the invention.

BRIEF DESCRIPTION OF THE INVENTION

DETAILED DESCRIPTION OF THE PREFERRED EMBODIMENT

Figure 1:
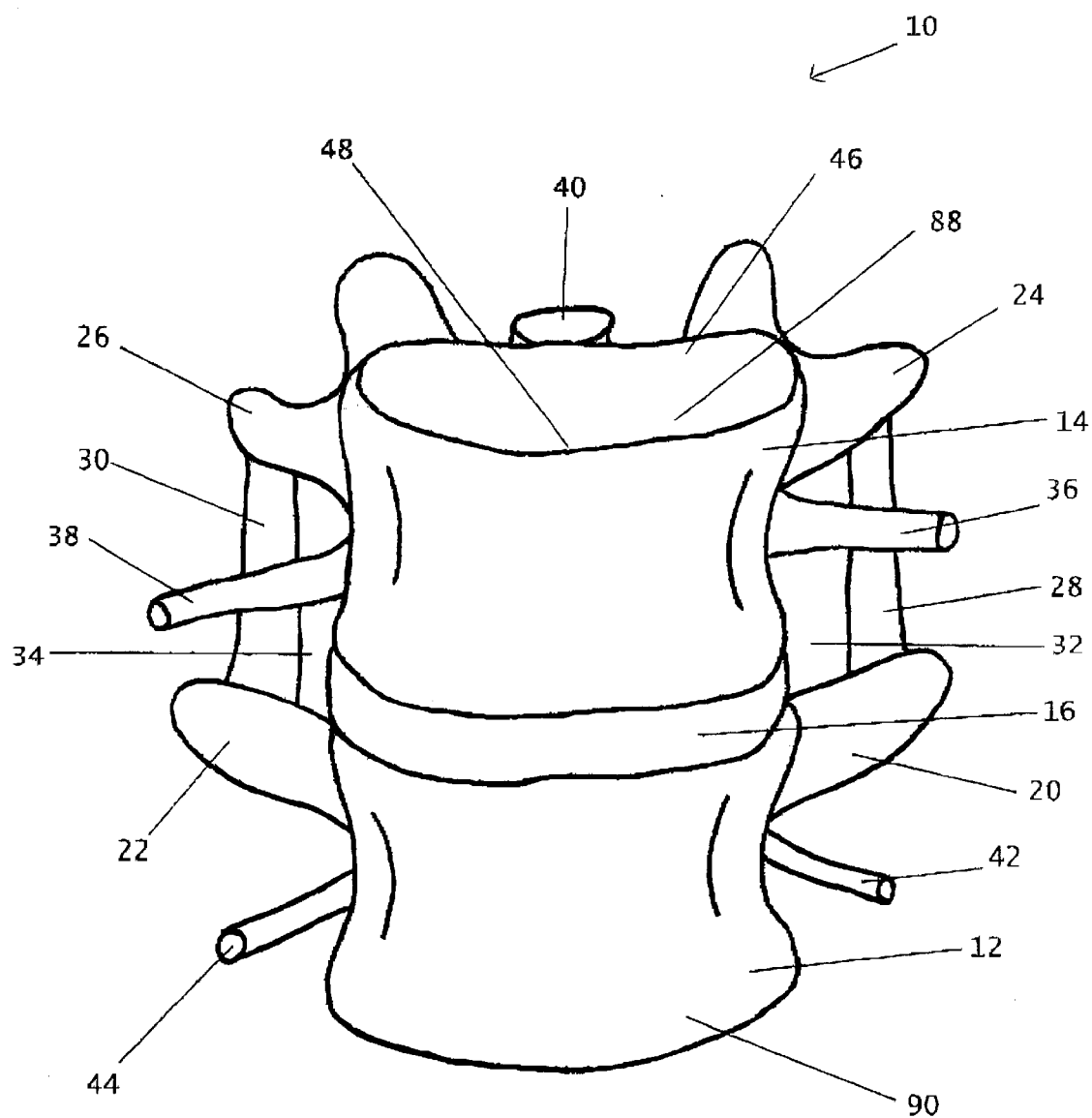
FIG. 1 is a front perspective view of the present invention in its aligned position.
Figure 3:
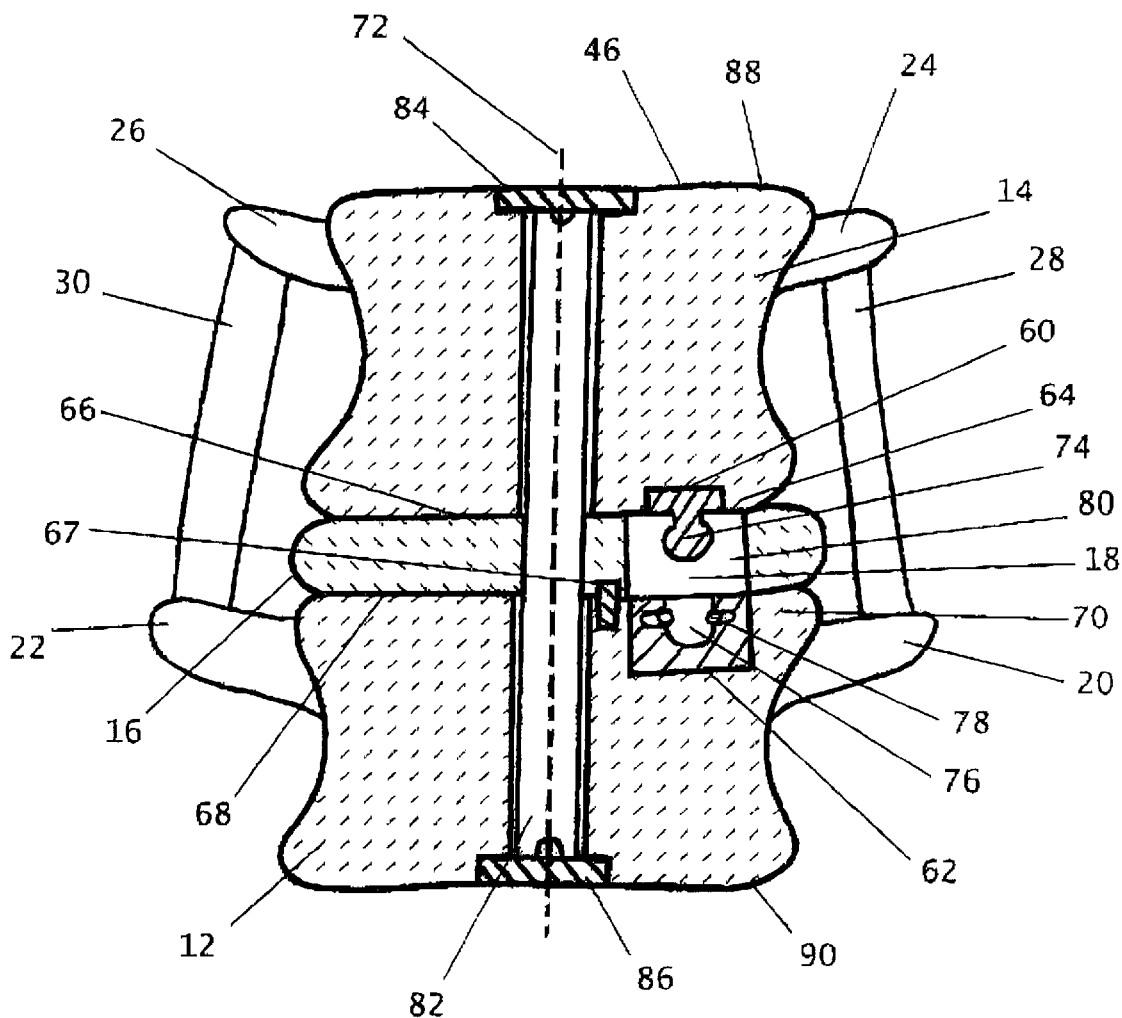
FIG. 3 is a cross-sectional view of the present invention.

Referring firstly to FIG. 1, the vertebral model made in accordance with the present invention is shown generally as Item 10 and consists of lower vertebrae member 12, upper vertebrae member 14, inter-vertebral disc member 16 and inter-vertebral locking mechanism 18 (see FIG. 3). Vertebral members 12 and 14 are movably mounted to each other such that model 10 can be moved between the aligned position shown in FIG. 1 to the misaligned position shown in FIG. 4. The locking mechanism permits the model to be releasably locked in its misaligned position.

Vertebral members 12 and 14 are three-dimensional models of the fifth and fourth lumbar vertebrae, respectively. To ensure the effectiveness of the model as a teaching aid, it is important that vertebral members 12 and 14 accurately and precisely mimic the structural features of real lumbar vertebrae. In particular, both members 12 and 14 should contain structural features corresponding to the spinous processes found in real lumbar vertebrae. Therefore, lower vertebrae member 12 has transverse spinous processes 20 and 22 while upper vertebrae member 14 has transverse spinous processes 24 and 26. The inter-transverse muscles are represented by elastic members 28 and 30. Elastic member 28 represents the left inter-transverse muscle and consists of an elongated elastic member having opposite ends, one such end being rigidly attached to transverse process 24 of upper vertebrae member 14 and the opposite end being attached to transverse spinous process 20 of lower vertebrae member 12. Elastic member 30 represents the right inter-transverse muscle and also consists of an elastic band having opposite ends, one end being rigidly attached to transverse spinous process 26 of upper vertebral member 14, and the opposite end being rigidly attached to transverse spinous process 22 of lower vertebral member 12. The spinal cord is represented by elongated elastic spinal cord member 40 which has a number of branching arms representing spinal nerves 36, 38, 42 and 44. As in a real spinal column, spinal nerve 36 passes through inter-vertebral foramen 32 which is formed between transverse spinal processes 20 and 24. Likewise, spinal nerve 38 passes through inter-vertebral foramen 34 which is formed between transverse spinous process 22 and 26 of vertebral members 12 and 14, respectively. Upper vertebral member 14 has top surface 46, and front edge 48.

Figure 2:
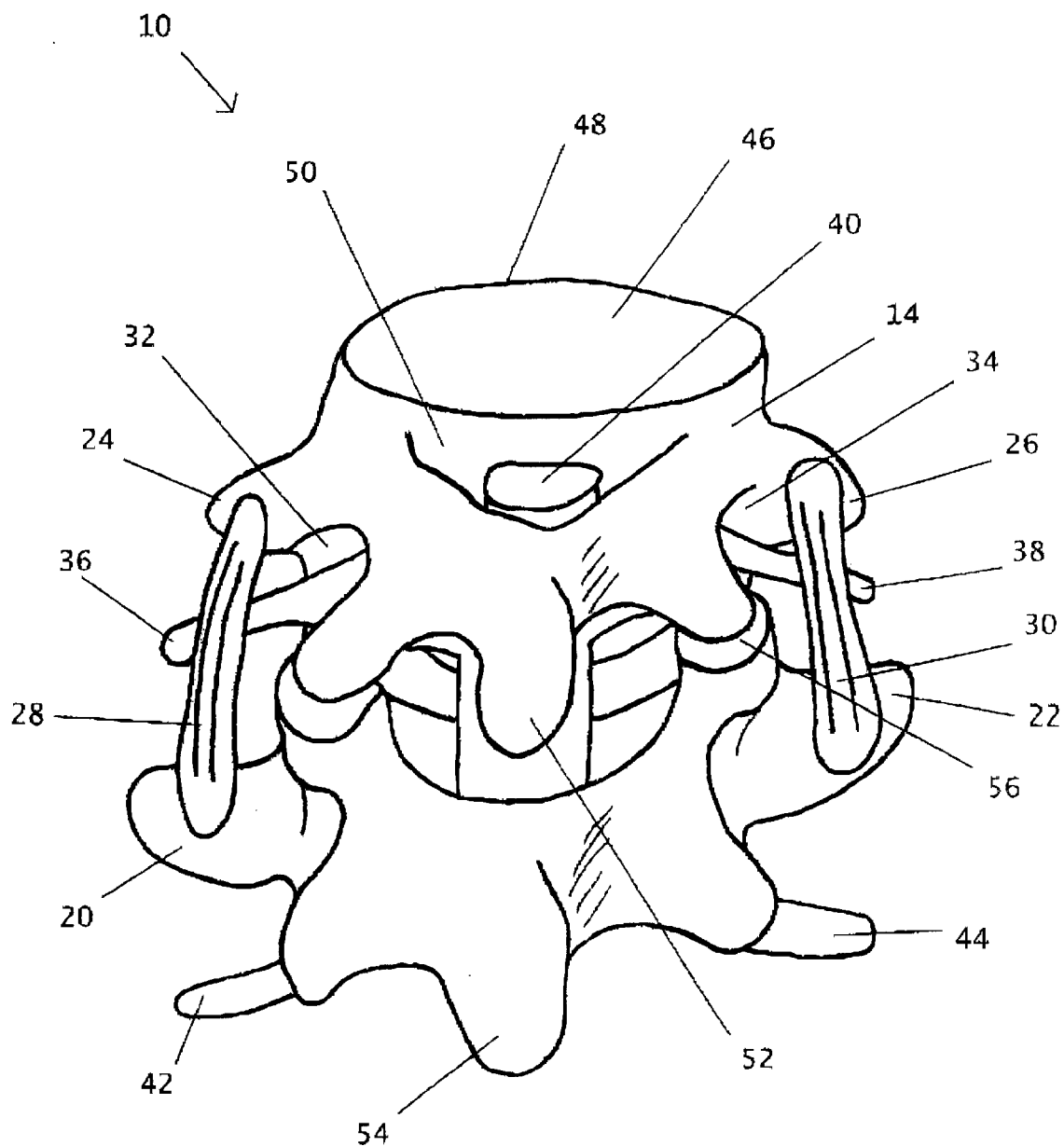
FIG. 2 is a rear perspective view of the present invention in its aligned position.

Referring now to FIG. 2, spinal cord member 40 consists of an elongated elastic member having branching arms 38, 36, 42 and 44. Spinal cord member 40 extends through central nerve canal 50 formed by spinous processes 52 and 54 of vertebral members 14 and 12, respectively. Model 10 also has a representation of a right articular facet joint 56 and a left articular facet joint 58.

Referring now to FIG. 3, locking mechanism 18 consists of upper locking element 60 and lower locking element 62. Locking element 60 is rigidly mounted to lower surface 66 of upper vertebral member 12 towards corner 64 such that locking element 60 is to one side of longitudinal axis 72. Lower lock element 62 is rigidly mounted to upper surface 68 of lower vertebral member 12 towards corner 70 such that the lower locking element is on one side of longitudinal axis 72. Blocking elements 60 and 62 are preferably aligned such that when corners 64 and 70 are urged towards each other, the locking elements engage. Locking elements 60 and 62 may consist of any releasable locking mechanism which can be coupled together when sufficient force is applied urging the two elements together. Locking elements 60 and 62 are further configured such that when sufficient force is applied to separate them, the locking elements release with an audible popping or clicking sound. In the present example, locking element 60 consists of a male locking element having protruding member 74 configured to be received within corresponding recess 76 of lower locking element 62. Preferably lower locking element 62 has spring biassed bearings 78 which are configured to engage protruding male member 74 when member 74 is inserted into recess 76. A fulcrum member, 67 is mounted to vertebral member 12 adjacent lower locking element 62 between the locking element and longitudinal axis 72. Fulcrum member 67 ensures that when members 12 and 14 are urged towards each other and locking mechanism 18 is engaged, the two members shall be unaligned. Furthermore, fulcrum member 67 ensures that when transverse spinous processes 26 and 22 are urged towards each other with sufficient force, locking mechanism 18 will disengage.

Upper vertebral member 14 is resiliently mounted to lower vertebral member 12 via elastic cord 82. Elastic cord 82 has opposing ends, each of which is rigidly mounted to anchor members 84 and 86. Preferably elastic cord 82 is under tension such that anchor plates 84 and 86 are biassed towards each other. Since anchor members 84 and 86 are rigidly mounted to vertebral members 14 and 12, respectively, the tension and elastic cord 82 biases member 14 and 12 towards each other. Since members 14 and 12 are biassed towards each other, they tend to remain in coaxial alignment. Furthermore, inter-vertebral disc member 16, being made of a resilient material, tends to resist deformation and also tends to bias members 14 and 12 into coaxial alignment. Finally, elastic members 28 and 30, being made of a resilient elastic material, also tends to bias members 14 and 12 into an aligned position.

Inter-vertebral disc member 16 preferably comprises a resilient foam rubber material which can be easily deformed. Inter-vertebral disc member 16 is provided with an aperture 80 surrounding locking mechanism 18. Inter-vertebral disc member 16 is sufficiently deformable so that when a user compresses the model by urging upper corner 88 of vertebral number 14 and lower corner 90 of vertebral member 12, towards each other, protruding male member 74 is inserted into recess 76 such that ball bearings 78 engage the male member and lock it into place within the recess. The dimensions of recess 76, bearing 78 and male member 74 are selected such that the force necessary to separate locking element 60 from 62 can be provided by the user simply by urging transverse processes 22 and 26 towards each other. Locking elements 62 and 60 are further configured such that when the two locking elements are disengaged they do so with an audible click or pop sound, again audibly recreating the sound of the vertebral column being re-aligned. Numerous suitable locking mechanisms are available on the marketplace. Since members 14 and 12 are biassed towards an aligned position, as soon as locking elements 62 and 60 are disengaged, the two members automatically return into their aligned position.

Figure 4:
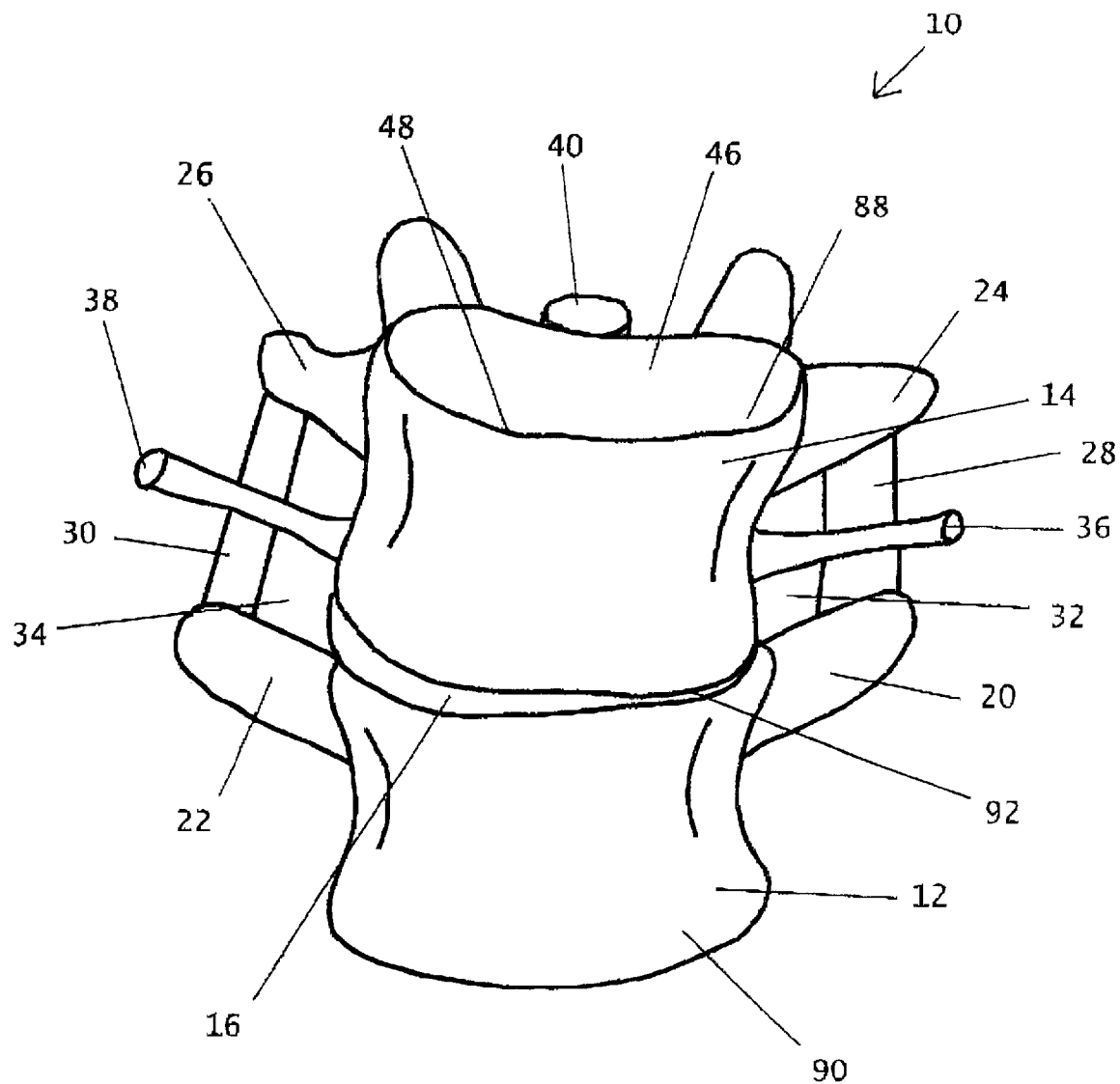
FIG. 4 is a front perspective view of the present invention in its misaligned position.

Referring now to FIGS. 1 and 4, upper vertebral member 14 and lower vertebral member 12 are movably mounted to each other such that the model can move between a first position as shown in FIG. 1 and a second position as shown in FIG. 4. When the model is in it's first position as shown in FIG. 1, inter-vertebral member 16 appears to be uniformly thick and vertebral members 12 and 14 appear to be in co-axial alignment. To move the model into its second position, a user merely urges upper corner 88 and lower corner 90 towards each other until the model is locked into it's second position as shown in FIG. 4. In it's second position, the model illustrates the medical condition of spinal misalignment wherein one vertebrae is misaligned relative to the other. In the second position, inter-vertebral disc member 16 is constricted at point 92 and vertebral members 14 and 12 are misaligned. Also, inter-transverse muscle 30 is stretched and inter-transverse muscle 28 is shortened when members 12 and 14 are placed into their misaligned position. This illustrates how, in real life, a spasm in one of the inter-transverse muscles can result in the misalignment of the spine. In real life, a spasm in an inter-transverse muscle will cause that muscle to contract and draw the transverse spinous processes towards each other. Drawing the transverse spinous processes together force the corresponding vertebrae out of alignment.

Figure 5:
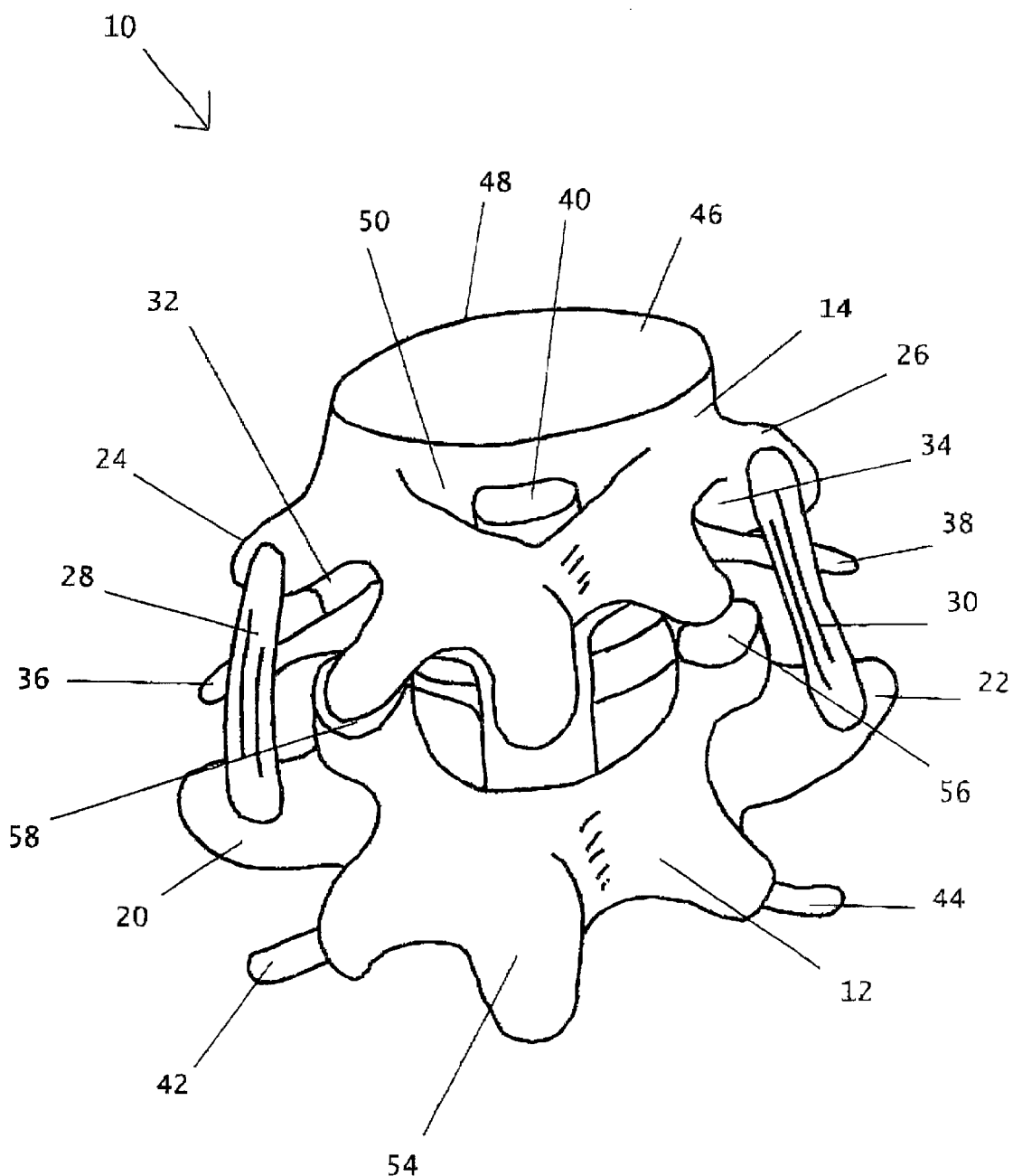
FIG. 5 is a rear perspective view of the present invention in its misaligned position.

Referring now to FIGS. 2 and 5, when model 10 is moved into it's second position as shown in FIG. 5, right articular facet joint 56 is separated and left articular facet joint 58 is compressed. There is also a constriction of inter-vertebral foramen 32 and expansion of inter-vertebral foramen 34. By moving the model between its first and second position, the model can be used to illustrate how misalignment can lead to constriction of spinal nerves, and how re-alignment of the vertebrae can relieve these conditions.

Figure 6:
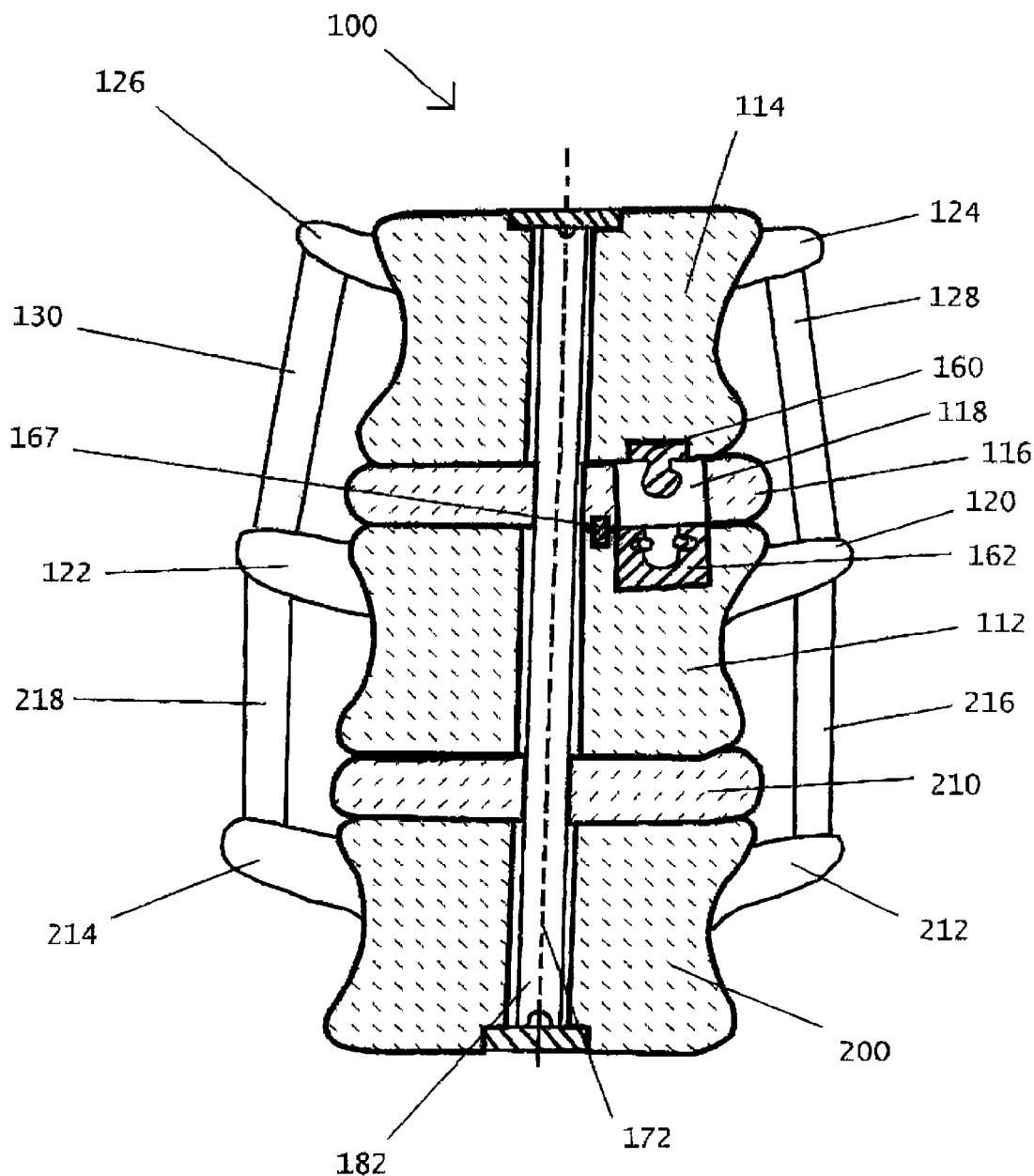
FIG. 6 is a cross-sectional view of an alternate embodiment of the present invention.

Referring now to FIG. 6, an alternate embodiment of the present invention is shown as item 100 and consist of three vertebrae members 1 14, 112 and 200. Vertebral members 112 and 114 are movably mounted to each other such that they can be moved between a coaxially aligned position and an unaligned position as in the previous embodiment. Inter-vertebral member 116 separates members 112 and 114 and is made of a resilient material such as foam rubber. Vertebral members 112 and 114 are provided with inter vertebral locking mechanism 118 which comprises locking upper locking element 160 and lower locking element 162. Vertebrae members 112 and 114, inter-vertebral member 116 and locking mechanism 118 are virtually identical in form and function to vertebral members 12 and 14, inter-vertebral member 16 and locking mechanism 18 respectively, of the previous embodiment (see FIG. 3). Vertebral member 112 also has fulcrum member 167 which permits vertebral member 114 to pivot relative to the fulcrum when members 112 and 114 are urged towards each other. Like the previous embodiment, locking mechanism 118 can releasably lock members 112 and 114 in an unaligned position. Also like the previous embodiment, locking mechanism 118 emits an audible "pop" sound when the locking mechanism releases, thereby simulating the sound normally associated with re-aligning human vertebrae. Again, like the previous embodiment, elastic chord 182, inter-vertebral member 116 and elastic members 128 and 130 help bias members 112 and 114 into an aligned position.

Vertebral member 200 is mounted to vertebral member 112 such that the two members can move slightly relative to each other. There is no locking mechanism between vertebral members 112 and 200, hence the two members cannot be locked into an unaligned position. Elastic chord 182, inter-vertebral member 210 and elastic members 216 and 218 help bias members 112 and 200 into an aligned position. This embodiment of the invention helps illustrates how two vertebrae, represented by members 114 and 112 can be out of alignment relative to a third vertebra, represented by member 200.

The model is used to illustrate the medical conditions associated with spinal misalignment and in particular the constriction of the inter-vertebral disc and the pinching of the spinal nerves due to constriction of the inter-vertebral foramen. The model is also used to illustrate how the misaligned vertebral column can be re-aligned by pressing on the spinous processes so as to replace the spines into the appropriate vertical alignment.

A specific embodiment of the present invention has been disclosed; however, several variations of the disclosed invention could be envisioned as within the scope of this invention. It is to be understood that the present invention is not limited to the embodiments described above, but encompasses any and all embodiments within the scope of the following claims.

What is claimed is:

1. A vertebral model useful in illustrating medical conditions of the spine comprising; a fist and second vertebral member movably mounted to each other, the first and second vertebral members each having a longitudinal axis, a disk member interposed between the first and second vertebral members, the first and second vertebral members being movable relative to each other between a first position, wherein the first and second vertebral members are substantially coaxially aligned, and a second position wherein the first and second vertebral members arm not coaxially aligned, and a lock mechanism for releasably locking the fist and second vertebral members in their second position, the first and second vertebral members biased towards their first position, the first and second vertebral members configured to resemble two adjoining vertebrae, the disk member configured to resemble an inter-vertebral disc between two adjoining vertebrae.

2. A vertebral model as defined in claim 1 wherein the disc member is made of a resilient deformable material and wherein a portion of the disc member is visibly compressed when the first and second vertebral members are moved into the second position.

3. A vertebral model as defined in claim 1 wherein the locking mechanism generates an audible signal when the first and second vertebral members are unlocked from their second position and moved towards their first position.

4. A vertebral model as defined in claim 1 further comprising a spinal chord member mounted to the first and second vertebral members, the spinal member configured to illustrate a portion of the spinal chord.

5. A vertebral model as defined in claim 1 wherein the first and second vertebral members each have right and left protrusions, said protrusions configured to illustrate the right and left transverse processes of adjoining vertebrae.

6. A vertebral model as defined in claim 5 further comprising a first elongated elastic member mounted between the right protrusions of the first and second vertebral members and a second elongated elastic member mounted between the left protrusions of the first and second vertebral members, said first and second elastic members configured to illusrate real inter-transverse muscles.

7. A vertebral model as defined in claim 4 wherein the first and second vertebral members each have right and left protrusions, said protrusions configured to illustrate the right and left transverse processes of real adjoining vertebrae, and further comprising a first elongated elastic member mounted between the right protrusions of the fist and second vertebral members and a second elongated elastic member mounted between the left protrusions of the first and second vertebral members.

8. A vertebral model as defined in claim 7 wherein the spinal chord member has transversely extending arms, said arms configured to illustrate the spinal nerves of a real spinal chord.

9. A vertebral model as defined in claim 1 further comprising a fulcrum member positioned between the first and second vertebral members, the fulcrum member configured such that when the two vertebral members are urged towards each other, the fulcrum member will force the two vertebral members out of coaxial alignment.

10. A vertebral model as defined in claim 9 wherein the fulcrum member is mounted to the first vertebral member to one side of the longitudinal axis of the first vertebral member.

11. A vertebral model as defined in claim 1 further comprising a third vertebral member mounted to the first vertebral member opposite the second vertebral member and a second disc member positioned between the first and third vertebral members, the third vertebral member configured to resemble a real vertebra, the third vertebral member and the first vertebral member being in substantially coaxial alignment.

12. A vertebral model as defined in claim 11 wherein the first and third vertebral members are also movable relative to each other between coaxially aligned and nonaligned positions, the first, second and third members being biased towards their aligned positions.

13. A vertebral model usefull in illustrating medical conditions of the spine comprising; a first and second vertebral member movably mounted to each other, the first and second vertebral members each having a longitudinal axis, a disk member interposed between the first and second vertebral members, the first and second vertebral members being movable relative to each other between a first position, wherein the first and second vertebral members are substantially coaxially aligned, and a second position wherein the first and second vertebral members are not coaxially aligned, and a locking mechanism for releasably locking the first and second vertebral members in their second position, the first and second vertebral members configured to resemble two adjoining vertebrae, the disk member configured to resemble an inter-vertebral disc between two adjoining vertebrae, and wherein the locking mechanism comprises corresponding first and second locking elements, the first locking element mounted to the first vertebral member and the second locking element mounted to the second vertebral member, the two locking elements mounted to their respective members such that the two elements engage when the two vertebral members are moved into their second position.

14. A vertebral model as defined in claim 13 wherein the first and second locking elements form a male/female joint when the two vertebral members are urged towards each other.

15. A vertebral model as defined in claim 14 wherein the first and second locking elements are mounted to one side of the longitudinal axis of the first and second vertebral members, respectively.

* * * * *